Nov. 22, 1966  A. M. MARSHALL  3,286,980

FLUID-FLOW CONTROL VALVES

Filed Oct. 11, 1963  2 Sheets-Sheet 1

Inventor

A.M. MARSHALL

By
Holcombe, Wetherill & Brisebois
Attorney

United States Patent Office 3,286,980
Patented Nov. 22, 1966

3,286,980
FLUID-FLOW CONTROL VALVES
Audrey May Marshall, Pentwyn, Rockfield,
Monmouthshire, Wales
Filed Oct. 11, 1963, Ser. No. 315,594
3 Claims. (Cl. 251—302)

This invention relates to valves for controlling the flow of fluid.

It is an object of the invention to provide a valve which can readily be opened for purposes of inspection without placing the pipe line controlled by the valve out of commission.

It is a further object of the invention to provide a valve which is simple and robust in construction and would be suitable for heavy duty.

According to the invention, in a valve for controlling the flow of fluids having a housing, formed by separable parts of which one is provided with a bore defining a passage through the housing, and a plate-like valve member having a toothed periphery and an opening adapted to register, in one position of the member, with the bore and movable across the bore between the ends thereof from said position by means engaging the said periphery to vary the cross-sectional dimensions of the passage, the valve member is mounted on a pivot carried by another part of the housing which is removable from the first-mentioned part and which projects laterally therefrom.

According to a further feature of the invention, the pivot is removable from the said other part to enable the said part to be removed from the housing without disturbing the valve member.

The invention is illustrated by way of example in the accompanying drawings in which.

Figure 1:
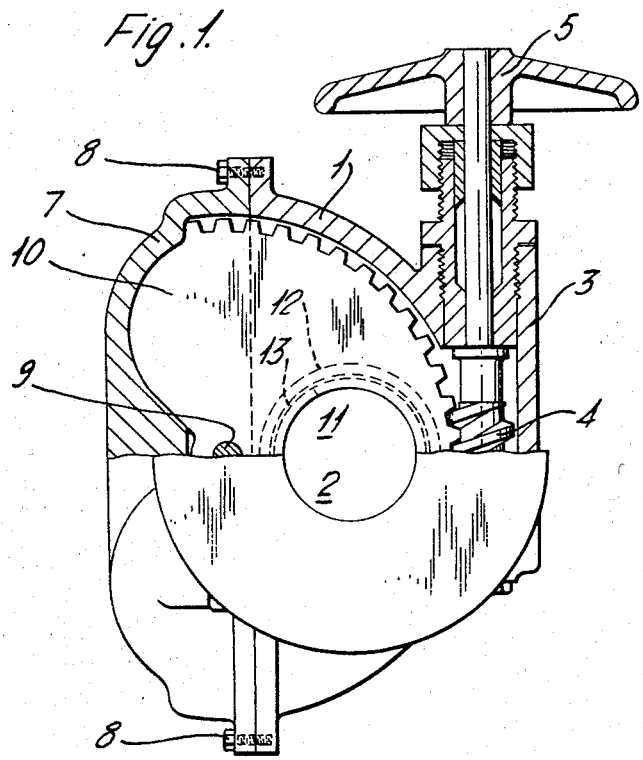
FIG. 1 is a sectional end elevation.
Figure 2:
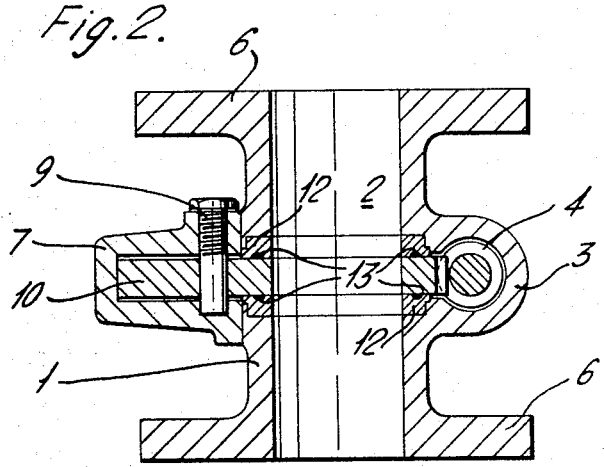
FIG. 2 is a sectional plan of a valve embodying the invention.

Referring to the accompanying drawings, a valve housing part 1 has a bore 2 extending through the said part and, on one side, a lateral extension 3 which rotatably supports a worm 4 arranged to be rotated by a handwheel 5. The housing part 1 is shown provided with flanges 6 for connection to a flanged pipe line but known means other than flanges may be provided for such connection. Another housing part 7 which projects laterally from the part 1 is removably secured to the latter part by studs such as the studs 8. A pivot 9 which is removably carried by the part 7 supports a plate like valve member 10 which is provided with an opening 11 and the valve member is movable about the pivot 9 into and from an open position in which the opening 11 registers with the bore 2. In the closed position of the valve member, the opening 11 is wholly displaced from the bore 2 so that the passage provided by the bore is closed. Hardened inserts 12 which are set into the housing part 1 are provided with annular rubber packing rings 13 against which the valve member 10 continuously bears. The pivotal movement of the valve member is effected upon rotation of the worm 4 which engages teeth 14 on the periphery of the valve member 10.

The rings 13 may have a circular or D-shaped cross-section.

Figure 3:
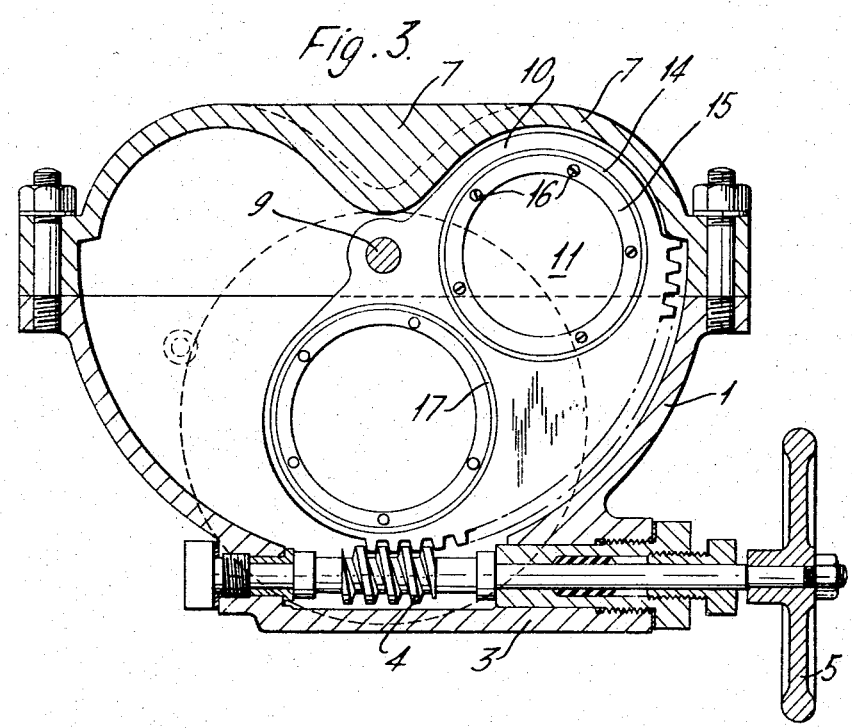
FIG. 3 is a sectional end elevation of a modified construction.

Instead of, or as well as, using packing rings 13 which are mounted on fixed supports such as the inserts 12, a pair of rubber or like sealing rings 14 may, as shown in FIG. 3, be mounted at each peripheral edge of the opening 11 in the plate-like valve member 10. These rings may be held in place by rigid rings 15 attached to the member 10 by screws 16 or the like. By moving the member 10 to one of its end positions after the part 7 has been removed, the peripherally arranged rubber rings may be removed and replaced when desirable. When this arrangement is used, leakage past the member 10 is prevented by similar rubber rings 17 fixed to the member and arranged to register with the walls of the part 1 around the bore 2.

In the construction shown, the housing part 7 may be removed after the pivot 9 has been withdrawn without the valve member 10 to enable the effectiveness of the packing rings to be examined and the condition of the valve to be otherwise inspected and this can be done without disturbing the flow of fluid through the bore 2 when the valve member 10 is in its closed position. The part 7 may also be removed simultaneously with the valve member 10.

The valve shown lends itself to large-scale construction and is relatively simple to construct and maintain.

I claim:

1. A valve, for controlling the flow of fluids, having a housing formed by separable housing parts of which one is provided with a bore defining a passage through the housing for a fluid, releasable means connecting the said housing parts, a plate-like valve member having an opening therethrough and movable from a position in which the said opening registers with the said bore into another position in which the opening is disposed within another of the said housing parts, surfaces on the valve member adapted to close the bore in the said other position of the valve member, packing means on the valve member around the opening in the said valve member positioned to be exposed upon separation of said housing parts, means for moving the valve member from the first-mentioned position into and from said other position and a valve member pivot supported by the said other housing part and removable therefrom without moving the valve member from said other position, whereupon release of said releasable means permits the housing parts to be separated and said packing means to be exposed for inspection.

2. A valve, for controlling the flow of fluids, having a housing formed by separable housing parts of which one is provided with a bore defining a passage through the housing for a fluid, releasable means connecting the said housing parts, a plate-like valve member having an opening therethrough and movable from a position in which the said opening registers with the said bore into another position in which the opening is disposed within another of the said housing parts, surfaces on the valve member and movable from a position within the said other housing part to a position to close the said bore when the valve member is moved to said other position thereof, packing means on the valve member around the opening in the said valve member positioned to be exposed upon separation of said housing parts, further packing means on the valve member and arranged to surround the bore in the said other position of the valve member, means for moving the valve member from one of the said positions into the said other position and a valve member pivot supported by the said other housing part and removable therefrom without moving the valve member from either of the said positions, whereupon release of said releasable means permits said valve member and packing means to be exposed for inspection by removal of said other housing part.

3. A valve, for controlling the flow of fluids, having a housing formed by separable housing parts of which one is provided with a bore defining a passage through the housing for a fluid, releasable means connecting the said parts, a plate like valve member having an opening therethrough and a toothed periphery, pairs of annular packing members of which one pair are coaxially disposed with relation to the opening in the valve member and another pair are carried by a solid part of the valve member, means engaging the toothed periphery for swinging the valve member into positions in which one of the said pairs registers with the walls of the housing around the said bore and the other pair is enclosed by a housing part which is removable to expose the said other pair of packing means for inspection and a valve member pivot supported by the said removable housing parts and removable therefrom without disturbing the valve member.

References Cited by the Examiner

UNITED STATES PATENTS

| | | | |
|---|---|---|---|
| 975,153 | 11/1910 | O'Neill et al. | 137—454.5 X |
| 1,002,948 | 9/1911 | Ward | 251—249.5 |
| 1,761,217 | 6/1930 | Lukomski | 137—454.2 X |
| 2,845,954 | 8/1958 | Hamer | 251—302 X |
| 2,952,437 | 9/1960 | Knox | 251—302 X |
| 3,047,006 | 7/1962 | Transeau | 251—301 X |
| 3,198,482 | 8/1965 | Bertels | 251—302 |

FOREIGN PATENTS

| | | |
|---|---|---|
| 2,080 | 1904 | Great Britain. |
| 434,557 | 9/1935 | Great Britain. |
| 1,040,804 | 5/1953 | France. |

M. CARY NELSON, *Primary Examiner.*

S. SCOTT, *Examiner.*